United States Patent
Anand et al.

(10) Patent No.: US 7,627,656 B1
(45) Date of Patent: Dec. 1, 2009

(54) PROVIDING CONFIGURATION INFORMATION TO AN ENDPOINT

(75) Inventors: Adibettahalli Anand, Sunnyvale, CA (US); Qin Chen, San Jose, CA (US); Marcio G. Siqueira, San Jose, CA (US); Tom WeiLiang Chang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 752 days.

(21) Appl. No.: 11/129,818

(22) Filed: May 16, 2005

(51) Int. Cl.
*G06F 15/177* (2006.01)
*G06F 15/16* (2006.01)
*G06F 3/00* (2006.01)

(52) U.S. Cl. .................. 709/220; 709/223; 709/224

(58) Field of Classification Search .......... 705/5, 705/6, 1, 28, 26, 27; 709/204, 206–207, 709/217–220; 718/103, 107, 758; 725/40, 725/39, 37, 32, 22; 370/229, 230
See application file for complete search history.

(56) References Cited

U.S. PATENT DOCUMENTS

| | | | |
|---|---|---|---|
| 6,446,200 B1 * | 9/2002 | Ball et al. ................. | 713/1 |
| 6,615,253 B1 * | 9/2003 | Bowman-Amuah ......... | 709/219 |
| 6,640,244 B1 * | 10/2003 | Bowman-Amuah ......... | 709/207 |
| 6,834,298 B1 * | 12/2004 | Singer et al. .............. | 709/220 |
| 6,957,390 B2 * | 10/2005 | Tamir et al. ............... | 715/744 |
| 2002/0013827 A1 * | 1/2002 | Edstrom et al. ............ | 709/219 |
| 2003/0018755 A1 * | 1/2003 | Masterson et al. ......... | 709/220 |
| 2004/0128367 A1 * | 7/2004 | Piercy et al. .............. | 709/220 |
| 2004/0204070 A1 * | 10/2004 | August et al. ............. | 455/557 |
| 2004/0210646 A1 * | 10/2004 | Sushima et al. ........... | 709/220 |
| 2005/0114462 A1 * | 5/2005 | Mathew et al. ............ | 709/207 |
| 2007/0127426 A1 * | 6/2007 | Watters et al. ............ | 370/338 |

OTHER PUBLICATIONS

Job Aid: Avaya Installation Wizard for Avaya S8300, S8500, and S8700-Series Media Servers and Avaya G350 and G700 Media Gateways, Avaya, 555-245-754, Issue 3.1, 14 pages, Jan. 2005.
Deployment Guide for the Security Configuration Wizard, Microsoft Windows Server 2003, Microsoft Corporation, 14 pages, Mar. 2005.
Performing an Automatic Configuration Inside NMMGR, © 2004-2005 Hewlett-Packard Development Company, L.P., http://docs.hp.com/en/32022-90051/ch03s02.html, 5 pages, printed May 13, 2005.

* cited by examiner

*Primary Examiner*—David R Vincent
*Assistant Examiner*—Ola Olude-Afolabi
(74) *Attorney, Agent, or Firm*—Baker Botts L.L.P.

(57) ABSTRACT

Providing configuration information to an endpoint includes receiving at a file server a configuration information request from the endpoint. The configuration information request requests configuration information for the endpoint. The file server establishes whether the endpoint is authorized to receive the configuration information. If the endpoint is not authorized to receive the configuration information, the endpoint is instructed to register to receive the configuration information. A notification that the endpoint is authorized to receive the configuration information is received. The configuration information is provided to the endpoint when the endpoint is authorized to receive the configuration information.

14 Claims, 2 Drawing Sheets

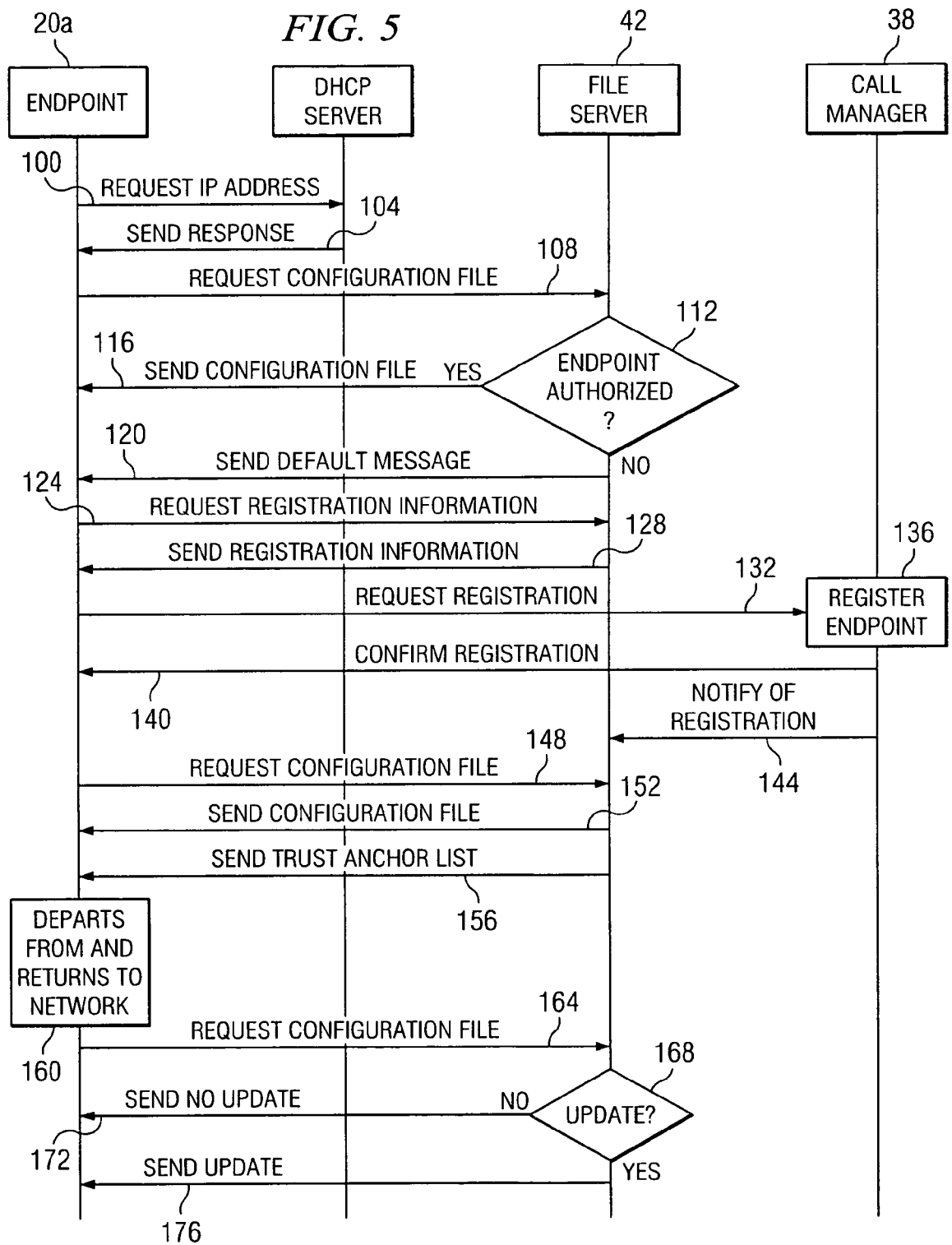

PROVIDING CONFIGURATION INFORMATION TO AN ENDPOINT

TECHNICAL FIELD

This invention relates generally to the field of communication networks and more specifically to providing configuration information to an endpoint.

BACKGROUND

Network architectures have grown increasingly complex in communication environments. Techniques have been developed to accommodate a diverse group of devices operating within these networking architectures. Some of these techniques relate to issues associated with device configuration.

Device configuration involves designating values for configuration parameters of a device to allow the device to establish and maintain communication. As an example, an endpoint may be configured to communicate with a network. Known techniques for configuring devices such as endpoints, however, are not satisfactory for certain types of endpoints. It is generally desirable to have satisfactory techniques for configuring these certain types of endpoints.

SUMMARY OF THE DISCLOSURE

In accordance with the present invention, disadvantages and problems associated with previous techniques for providing configuration information to endpoints may be reduced or eliminated.

According to one embodiment of the present invention, providing configuration information to an endpoint includes receiving at a file server a configuration information request from the endpoint. The configuration information request requests configuration information for the endpoint. The file server establishes whether the endpoint is authorized to receive the configuration information. If the endpoint is not authorized to receive the configuration information, the endpoint is instructed to register to receive the configuration information. A notification that the endpoint is authorized to receive the configuration information is received. The configuration information is provided to the endpoint when the endpoint is authorized to receive the configuration information.

Certain embodiments of the invention may provide one or more technical advantages. A technical advantage of one embodiment may be that configuration information is provided by a file server only to authorized endpoints. If an endpoint is not authorized, the endpoint may be instructed to register with a call manager. The configuration information is provided to the endpoint after the file server has received a notification that the endpoint has registered. The embodiment may allow for providing configuration information to third party endpoints. Another technical advantage of one embodiment may be that a configuration system may provide configuration interfaces into which configuration information may be entered.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 5 is a call flow diagram illustrating one embodiment of a method for providing configuration information to an endpoint.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
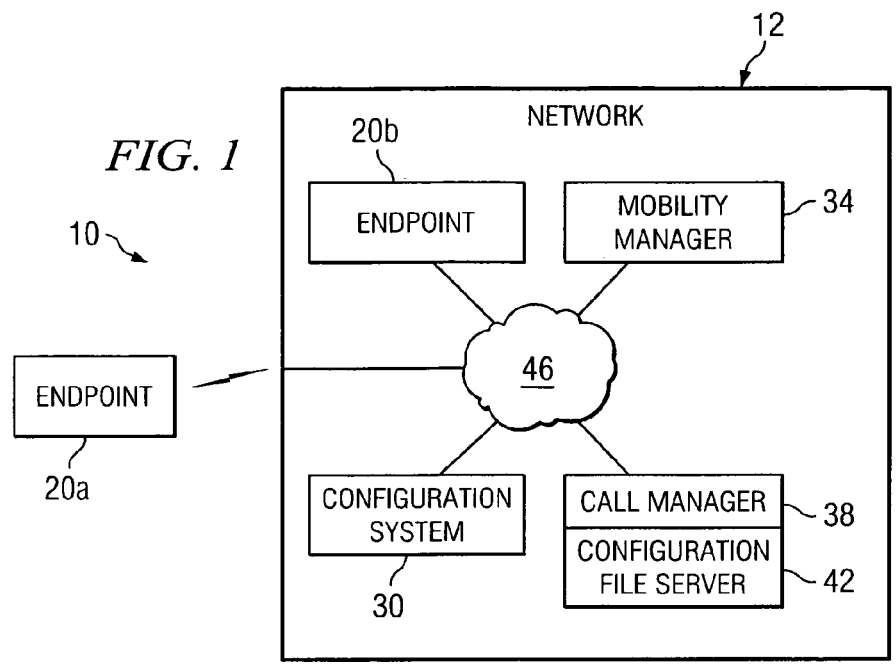
FIG. 1 is a block diagram illustrating one embodiment of a system for providing configuration information to an endpoint.

FIG. 1 is a block diagram illustrating one embodiment of a system 10 for providing configuration information to an endpoint. System 10 includes a communication network 12 that provides configuration information to an endpoint 20a that is external to communication network 12. Communication network 12 may also allow a user to designate configuration values for devices of communication network 12 in order to establish and maintain communication for endpoint 20a.

According to the illustrated embodiment, system 10 may utilize circuit-based or packet-based techniques or both to provide telephony services. Packet-based techniques communicate information in packets. A packet may comprise a bundle of data organized in a specific way for transmission, and a frame may comprise the payload of one or more packets organized in a specific way for transmission. A packet may carry any suitable information such as voice, data, video, audio, multimedia, other information, or any combination of the preceding. A packet-based communication protocol such as Internet Protocol (IP) may be used for the packet-based techniques.

System 10 may also utilize digital cellular protocols and technologies. Example digital cellular protocols and technologies include those set by 802.11 standards, Global System for Mobile communications (GSM) standards, or other standards to provide wireless telephony services.

According to the embodiment, system 10 includes endpoint 20a and communication network 12. An endpoint may refer to any suitable logic comprising software, hardware, other logic, or any suitable combination of the preceding operable to communicate with a communication network. An endpoint may comprise, for example, a personal digital assistant, a cellular telephone, a mobile handset, or any other device suitable for communication.

According to the illustrated embodiment, endpoint 20a is external to network 12. Endpoint 20a may represent a mobile wireless device that enters within the wireless range of network 12. Endpoint 20a may also leave the range, and then return to the range. Endpoint 20a may utilize packet-based and cellular protocols and technologies such as those set by the 802.11 standards.

Endpoint 20a may need to be configured to communicate with network 12. Configuration may refer to setting values for configuration parameters. A configuration parameter may refer to a parameter that defines an operation of the logic of a device. Logic may comprise hardware, software, other logic, or any combination of the preceding. Examples of configuration parameters for endpoint 20 may include an extension number parameter, a call control server parameter, or other suitable parameter. An extension number parameter may be used to specify an extension number for an endpoint 20. A value for the parameter may represent the specific extension number. A call control server parameter may be used to designate a call control server for endpoint 20. A value for the parameter may represent the IP address of the call control server.

Other configuration parameters for endpoint 20a may be used. For example, parameters may describe endpoint 20a, such as device type, user identifier, device pool, or other device-describing parameters. Parameters may specify time settings, such as date-time setting, date format, time zone, or other time-setting parameters. Parameters may describe a call manager, such as call manager group, call manager group members, member priority, or other call manager parameters. Parameters may specify port numbers, such as IP port, endpoint port, media gateway control protocol (MGCP) port, or other port parameters. Parameters may describe options, such as listen, keep alive, Survivable Remote Site Telephony (SRST) option, user modifiable, or other option parameters.

Communication network 12 may represent any suitable combination or arrangement of components supporting communication between endpoints 20. A communication network may refer to all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

According to one embodiment, communication network 12 represents an enterprise network. An enterprise network may refer to a network that includes devices managed separately from devices of other networks, and may have its own security management. An example enterprise network may comprise a local area network or a wide area network. An enterprise network may be associated with one or more entities, such as one or more companies, located at one or more places.

According to the illustrated embodiment, network 12 comprises one or more internal endpoints 20b, a configuration system 30, and one or more managing devices coupled by an internal communication network 46. Internal endpoints 20b represents an endpoint internal to network 12.

Configuration system 30 allows a user to designate values for configuration parameters for configuring the managing devices of network 12. According to one embodiment, configuration system 30 accesses a configuration template and generates a configuration interface according to the configuration template. The configuration interface may include configuration parameter fields into which a user may enter configuration values for specific configuration parameters. Configuration system 30 may use the configuration values to configure the managing devices. An example configuration system is described in more detail with reference to FIG. 2.

The managing devices may refer to devices of network 12 that allow for communication between endpoints 20, and are typically configured to provide the communication. According to the illustrated embodiment, the managing devices include a mobility manager 24 and a call manager 38.

Mobility manager 34 may represent any suitable logic comprising software, hardware, other logic, or any suitable combination of the preceding operable to support the entrance and exit of endpoint 20a to and from network 12. Mobility manager 26 may comprise a server or other appropriate device, for example, a router, switch, bridge, gateway, or other device that supports the entrance and exit of endpoint 20a to and from network 12.

Call manager 38 may represent any suitable logic comprising software, hardware, other logic, or any suitable combination of the preceding operable to provide telephony services over network 26. For example, call manager 38 may support voice over IP (VoIP) communication, using any suitable communication protocol, such as SIP, signaling connection control point (SCCP) protocol, media gateway control protocol (MGCP), H.323, other appropriate protocol for VoIP, or a combination of any of the preceding. Call manager 38 may also support call management features, such as call hold, park, transfer, redirect, other call management feature, or any combination of the preceding. Endpoint 20a may register with call manager 48 in order to receive call control messages.

Configuration file server 42 provides configuration information to endpoints 20. Configuration information may refer to information that may be used by endpoints 20 to configure themselves, and may be represented as a configuration file. Configuration information may include configuration values for configuration parameters. Example configuration parameters may include extension numbers, the IP address of a call control server, or the IP address of a call processing server.

According to one embodiment of operation, internal endpoint 20b of network 12 may obtain configuration information directly from configuration file server 42. The configuration information may be provided to endpoint 20b through the Trivial File Transfer Protocol (TFTP). Typically, however, a TFTP does not require endpoint 20b to provide a passcode. Accordingly, to provide some type of security, configuration file server 42 may assign a file with a value, which endpoint 20b may check to determine if the configuration information has not been altered.

According to the embodiment, endpoint 20a may be instructed to register with call manager 38 before receiving configuration information from file server 42. Endpoint 20a may register with configuration file server 42 using a HyperText Transfer Protocol (HTTP), HyperText Transfer Protocol Secure (HTTPS), or other suitable protocol. File server 42 may provide the configuration information after file server 42 has received a notification that endpoint 20a has registered. An example file server is described in more detail with reference to FIG. 4.

Internal communication network 46 comprises a network that couples the components of network 12 and provides for communication among the components.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of mobility manager 34 and call manager 38 may be performed by one module, or the operations of configuration system 30 may be performed by more than one module. Additionally, operations of system 10 may be performed using any suitable logic comprising software, hardware, other logic, or any suitable combination of the preceding. As used in this document, "each" refers to each member of a set or each member of a subset of a set.

Figure 2:
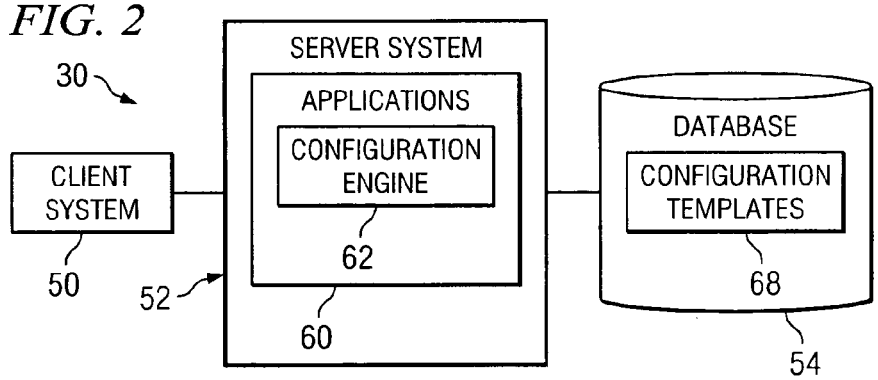
FIG. 2 is a block diagram illustrating one embodiment of a configuration system operable to allow a user to designate configuration values for devices of a network.

FIG. 2 is a block diagram illustrating one embodiment of a configuration system 30 operable to allow a user to designate configuration values for devices of network 12. According to the illustrated embodiment, configuration system 30 includes a client system 50, a server system 52, and a database 54 coupled as shown.

According to one embodiment, client system 50 allows a user to communicate with server system 52 to designate configuration values for devices. Client system 50 may include any hardware, software, other logic, or combination of the preceding for communicating with server system 52, and may use any of a variety of computing structures, arrangements, and compilations to communicate with server system 52.

According to one embodiment, client system 50 may include an interface operable to allow a user to communicate with server system 52. The interface may include any hardware, software, other logic, or combination of the preceding to allow communication of audio, video, text, data, multimedia, other information, or any combination of the preceding between the user and server system 52. For example, an interface may comprise a display.

According to the embodiment, client system 50 may provide a configuration interface to a user. A configuration interface may refer to an interface into which a user may enter configuration values for configuration parameters. As an example, a configuration interface may comprise a graphical user interface. The configuration interface may include configuration parameter fields into which a user may enter configuration parameter values. According to the embodiment, client system 50 may generate the configuration interface in accordance with a configuration template received from server system 52. Client system 50 may receive user input entered into the configuration interface. Client system 50 may provide a response to server system 52 in accordance with a user input. As an example, the user input may comprise configuration parameter values, which client system 50 provides to server system 52.

Server system 52 manages applications operable to designate configuration values for devices 20. Server system 52 may include any hardware, software, other logic, or combination of the preceding for managing the applications, and may use any of a variety of computing structures, arrangements, and compilations to manage the applications. For example, server system 52 may include one or more processors. A processor may refer to any suitable device operable to execute instructions and manipulate data to perform operations.

According to the illustrated embodiment, server system 52 includes a configuration engine 62. Configuration engine 62 allows a user to designate configuration values for devices of network 12. According to one embodiment, configuration engine 62 sends a configuration template to client system 50. The configuration template may instruct client system 50 to gather parameter values for specific configuration parameters. Configuration engine 62 receives the parameter values from client system 50, and configures the devices according to the parameter values.

Database 54 may include any hardware, software, firmware, or combination of the preceding for storing and facilitating retrieval of information. Also, database 54 may use any of a variety of data structures, arrangements, and compilations to store and facilitate retrieval of information. Database 54 may comprise Random Access Memory (RAM), Read Only Memory (ROM), magnetic drives, disk drives, Compact Disk (CD) drives, Digital Video Disk (DVD) drives, removable media storage, any other suitable data storage device, or any combination of the preceding.

According to the illustrated embodiment, database stores configuration templates 68. A configuration template 68 may refer to a set of instructions that may be sent to client system 50 to instruct client system 50 to gather parameter values for specific configuration parameters. As an example, configuration templates 68 may instruct client system 50 to generate a configuration interface that has fields into which a user may enter the parameter values. An example configuration interface is described in more detail with reference to FIG. 3.

Client system 50, server system 52, and database 54 may operate on one or more computers and may include appropriate input devices, output devices, mass storage media, processors, memory, or other components for receiving, processing, storing, and communicating information according to the operation of system 30. For example, the functions of client system 50, server system 52, database 54, or any combination of the preceding may be provided using a single computer system, for example, a personal computer. As used in this document, the term "computer" refers to any suitable device operable to execute instructions and manipulate data to perform operations, for example, a personal computer, work station, network computer, wireless telephone, personal digital assistant, one or more microprocessors within these or other devices, or any other suitable processing device.

Client system 50, server system 52, and database 54 may be integrated or separated according to particular needs. If any of client system 50, server system 52, and database 54 are separated, the separated components may be coupled to each other using a local area network (LAN), a metropolitan area network (MAN), a wide area network (WAN), a global computer network such as the Internet, or any other appropriate wire line, wireless, or other link.

Figure 3:
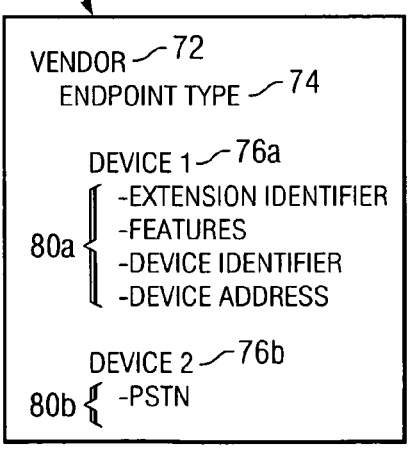
FIG. 3 is a diagram illustrating an example configuration interface that may be used with the configuration system of FIG. 2.

FIG. 3 is a diagram illustrating an example configuration interface 70 that may be used with configuration system 30 of FIG. 2. According to one embodiment, a user may use configuration interface 70 to designate configuration values for devices of network 12.

A configuration interface 70 may be created to designate configuration values to configure devices to provide communication for a particular endpoint 20. Configuration interfaces 70 for different endpoints 20 may be organized in any suitable manner. For example, configuration interfaces 70 may be organized such that a configuration interface 70 for a particular endpoint 20 may be readily identified. According to the illustrated embodiment, interfaces 70 are organized by vendor 72 and type 74 of endpoint 20. Vendor 72 may refer to a company that sells endpoint 20. Endpoint type 74 may refer to a particular make or model of endpoint 20.

A device 76 may refer to a device of enterprise network 12 that may be configured to provide communication for endpoint 20. According to the illustrated embodiment, device 76a represents a call manager 38, and device 76b represents mobility manager 34.

Configuration parameters 80 may be defined for each device 76. A first portion of configuration interface 70 includes configuration parameters 80a for device 76a. Configuration parameters 80a for device 76a may include an extension identifier, features, a device identifier, a device address, other configuration parameter, or any combination of the preceding. An extension identifier parameter may represent an extension number. A features parameter may represent features that may be enabled at endpoint type 74. A device identifier parameter may represent a device name of device 76a, such as the medium access control (MAC) address of call manager 38. Device address represents the address of device 76a, such as the IP address and port of call manager 38.

A second portion of configuration interface 70 includes configuration parameters 80b for device 76b. Configuration parameters 80*b* for device 76*b* may include a PSTN number, other suitable parameter, or any combination of the preceding.

Modifications, additions, or omissions may be made to configuration interface 70 without departing from the scope of the invention. Configuration interface 70 may include more, fewer, or other graphical elements. For example, configuration interface 70 may include more, fewer, or other parameters organized in any suitable fashion. Additionally, the graphical elements of configuration interface 70 may be arranged in any suitable manner without departing from the scope of the invention.

Figure 4:
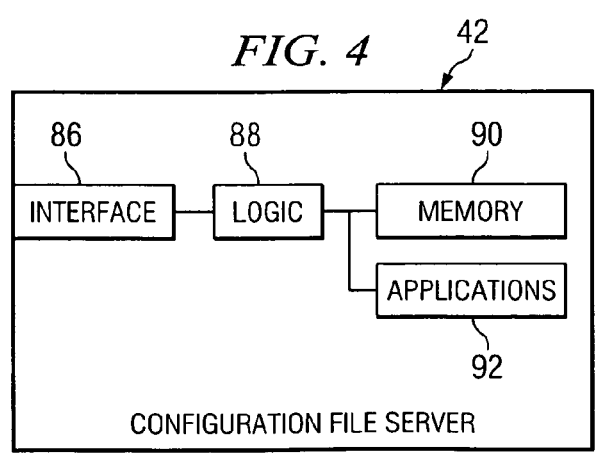
FIG. 4 is a block diagram illustrating one embodiment of a file server operable to provide configuration information to an endpoint.

FIG. 4 is a block diagram illustrating one embodiment of a file server 42 operable to provide configuration information to an endpoint 20. According to the illustrated embodiment, file server 42 includes an interface (I/F) 86, logic 88, memory 90, and one or more applications 92 coupled as shown. Interface 86 receives input for file server 42 and sends output from file server 42. An interface of a device may refer to any suitable logic comprising software, hardware, other logic, or any suitable combination of the preceding operable to receive input for the device, send output from the device, or both. An interface may also translate or convert or both input and output to allow the device to communicate with other devices.

Logic 88 manages the operation of file server 42, and may comprise any suitable logic comprising software, hardware, other logic, or any suitable combination of the preceding. For example, logic 88 may refer to a processor.

Memory 90 stores and facilitates retrieval of information used by logic 88. Memory may comprise Random Access Memory (RAM), Read Only Memory (ROM), magnetic drives, disk drives, Compact Disk (CD) drives, Digital Video Disk (DVD) drives, removable media storage, any other suitable data storage device, or a combination of any of the preceding.

Applications 92 operate to provide configuration information to an endpoint 20. According to one embodiment, applications 92 receive a configuration information request that requests configuration information for endpoint 20. The configuration information request may have a version identifier indicating a version of configuration information used by endpoint 20.

Applications 92 establish whether the endpoint is authorized to receive the configuration information. Establishing whether the endpoint is authorized may be performed in any suitable manner. If endpoint 20 is not authorized to receive the configuration information, applications 92 instruct endpoint 20 to register to receive the configuration information. Applications 92 may instruct endpoint 20 by sending endpoint 20 a message indicating that endpoint 20 is not allowed to receive a configuration information. If applications 92 receive a request for registration information from the endpoint, applications 92 provide the registration information to endpoint 20.

If applications 92 receive a notification that endpoint 20 is authorized, then applications 92 provide the configuration information to endpoint 20. According to one embodiment, applications 92 establish whether the version identifier indicates that the configuration information is a current version used at file server 38. If the version identifier indicates that the configuration information is not the current version, applications 92 provide an update to endpoint 20.

Modifications, additions, or omissions may be made to file server 42 without departing from the scope of the invention. Interface 86, logic 88, memory 90, and applications 92 may be integrated or separated according to particular needs. For example, the present invention contemplates the functions of both logic 88 and memory 90 being provided using a single device, for example, a single integrated circuit. If logic 88 and memory 90 are separated, logic 88 may be coupled to memory 90 using a bus or other suitable link.

Moreover, the operations of file server 42 may be performed by more, fewer, or other modules. Additionally, operations of file server 42 may be performed using any suitable logic comprising software, hardware, other logic, or any suitable combination of the preceding.

FIG. 5 is a call flow diagram illustrating one embodiment of a method for providing configuration information to an endpoint 20. According to one embodiment, endpoint 20*a* represents a mobile device that may move into the range of network 12 and out of the range of network 12.

The method begins at step 100, where endpoint 20*a* requests an IP address. According to one embodiment, endpoint 20*a* may send a Dynamic Host Configuration Protocol (DHCP) request to a DHCP server. The request may request an IP address for endpoint 20*a* and a location of configuration file server 42.

A response is sent to endpoint 20*a* at step 104. The response may include the IP address of endpoint 20*a* and the location of file server 42. The location of file server 42 may be represented as the IP address of file server 42. Endpoint 20*a* requests a configuration file from file server 42 at step 108. Endpoint 20*a* may send a configuration file request, such as a DHCP request, which may include the IP address of endpoint 20*a*.

File server 42 determines whether endpoint 20*a* is authorized to receive a configuration file at step 112. Endpoint 20*a* may be authorized if certain procedures have been performed to allow endpoint 20*a* access to the configuration file. For example, endpoint 20*a* may be authorized if endpoint is registered at call manager 38. File server may use the IP address of endpoint 20*a* to determine if endpoint 20*a* is authorized.

If endpoint 20*a* is authorized to receive the configuration file, file server 42 sends the configuration file at step 116. File server 42 may send a configuration file response, such as a DHCP response, that includes the configuration file. A configuration file may include information used by endpoint 20*a* to configure itself. The configuration file may have a version identifier that indicates the version of the configuration file.

If endpoint 20*a* is not authorized to receive the configuration file, file server 42 sends a default message at step 120. The default message may indicate that endpoint 20*a* cannot receive a configuration file from file server 42. Endpoint 20*a* requests registration information at step 124. Registration information may refer to information that endpoint 20*a* may use to register with call manager 38. File server 42 sends the registration information to endpoint 20*a* at step 128. The registration information may include the IP address of call manager 38 where endpoint 20*a* may register.

Endpoint 20*a* requests registration from call manager 38 at step 132. Call manager 38 may register endpoint 20*a* in response to the request at step 136. Call manager 38 sends a registration confirmation to endpoint 20*a* at step 140. Call manager 38 notifies file server 42 that endpoint 20*a* is registered at step 144. Accordingly, endpoint 20*a* is authorized to receive a configuration file from file server 42.

Endpoint 20*a* requests a configuration file from file server 42 at step 148. File server 42 sends the configuration file to endpoint 20*a* at step 152. The configuration file may have a signature that endpoint 20*a* may use to verify the configuration file. File server 42 may also send a trust anchor list to endpoint 20*a* at step 156.

Endpoint 20*a* departs from network 26, and returns to network 26 at step 160. Endpoint 20*a* requests a configuration file at step 164. The request may include a version identifier of the configuration file used by endpoint 20*a*. File server 42 determines whether endpoint 20*a* needs an updated configuration file at step 168. File server 42 may determine whether endpoint 20*a* needs an updated configuration file by looking at the version identifier sent in the request. If the version identifier does not indicate the current version used by file server 42, then endpoint 20*a* may be using an outdated version and may require an update.

If endpoint 20*a* does not require an update, file server 42 notifies endpoint 20*a* that no update is needed at step 172. If endpoint 20*a* requires an update, file server 42 sends the update information to endpoint 20*a* at step 176. The update information may include, for example, the current version of the configuration file used by file server 42. Alternatively, the update information may include differences between the version of the configuration file that endpoint 20*a* has and the current version of the configuration file. The method then terminates.

Modifications, additions, or omissions may be made to the method without departing from the scope of the invention. As an example, the endpoint might not request the configuration file, such as if there is a momentary loss of wireless contact. Moreover, the method may include more, fewer, or other steps. Additionally, steps may be performed in any suitable order without departing from the scope of the invention.

Certain embodiments of the invention may provide one or more technical advantages. A technical advantage of one embodiment may be that configuration information is provided by a file server only to authorized endpoints. If an endpoint is not authorized, the endpoint may be instructed to register with a call manager. The configuration information is provided to the endpoint after the file server has received a notification that the endpoint has registered. The embodiment may allow for providing configuration information to third party endpoints. Another technical advantage of one embodiment may be that a configuration system may provide configuration interfaces into which configuration information may be entered.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for providing configuration information to an endpoint, comprising:

receiving at a file server a configuration information request from an endpoint, the configuration information request requesting configuration information for the endpoint;

establishing whether the endpoint is authorized to receive the configuration information;

if the endpoint is not authorized to receive the configuration information:

instructing the endpoint to register to receive the configuration information; and receiving a notification that the endpoint is authorized to receive the configuration information;

providing the configuration information to the endpoint when the endpoint is authorized to receive the configuration information;

receiving at the file server a second configuration information request from the endpoint, the second configuration information request having a version identifier;

establishing whether the version identifier indicates that the configuration information is a current version used at the file server; and if the version identifier indicates that the configuration information is not the current version, providing, by the file server, an update to the endpoint that comprises one or more differences between the version of the configuration information identified by the version identifier and the current version of the configuration information.

2. The method of claim 1, wherein instructing the endpoint to register to receive the configuration information further comprises:

sending the endpoint a message indicating that the endpoint is not authorized to receive the configuration information;

receiving a request for registration information from the endpoint, the registration information referring to information for registering the endpoint; and providing the registration information to the endpoint.

3. The method of claim 1, wherein receiving the notification that the endpoint is authorized to receive the configuration information further comprises:

receiving the notification, the notification sent in response to registration of the endpoint.

4. The method of claim 1, wherein providing the update further comprises providing:

the current version of the configuration information.

5. A system for providing configuration information to an endpoint, comprising:

an interface operable to receive a configuration information request from an endpoint, the configuration information request requesting configuration information for the endpoint; and a processor coupled to the interface and operable to execute one or more applications to:

establish whether the endpoint is authorized to receive the configuration information;

if the endpoint is not authorized to receive the configuration information:

instruct the endpoint to register to receive the configuration information; and receive a notification that the endpoint is authorized to receive the configuration information; and provide the configuration information to the endpoint when the endpoint is authorized to receive the configuration information;

receive at the file server a second configuration information request from the endpoint, the second configuration information request having a version identifier;

establish whether the version identifier indicates that the configuration information is a current version used at the file server; and if the version identifier indicates that the configuration information is not the current version, provide, by the file server, an update to the endpoint that comprises one or more differences between the version of the configuration information identified by the version identifier and the current version of the configuration information.

6. The system of claim 5, the processor operable to instruct the endpoint to register to receive the configuration information by:

sending the endpoint a message indicating that the endpoint is not authorized to receive the configuration information;

receiving a request for registration information from the endpoint, the registration information referring to information for registering the endpoint; and providing the registration information to the endpoint.

7. The system of claim 5, the processor operable to receive the notification that the endpoint is authorized to receive the configuration information by:

receiving the notification, the notification sent in response to registration of the endpoint.

8. The system of claim 5, the processor operable to provide the update by providing:

the current version of the configuration information.

9. Logic for providing configuration information to an endpoint, the logic embodied in a medium and operable to:

receive at a file server a configuration information request from an endpoint, the configuration information request requesting configuration information for the endpoint;

establish whether the endpoint is authorized to receive the configuration information;

if the endpoint is not authorized to receive the configuration information:

instruct the endpoint to register to receive the configuration information; and receive a notification that the endpoint is authorized to receive the configuration information; and provide the configuration information to the endpoint when the endpoint is authorized to receive the configuration information;

receive at the file server a second configuration information request from the endpoint, the second configuration information request having a version identifier;

establish whether the version identifier indicates that the configuration information is a current version used at the file server; and if the version identifier indicates that the configuration information is not the current version, provide, by the file server, an update to the endpoint that comprises one or more differences between the version of the configuration information identified by the version identifier and the current version of the configuration information.

10. The logic of claim 9, operable to instruct the endpoint to register to receive the configuration information by:

sending the endpoint a message indicating that the endpoint is not authorized to receive the configuration information;

receiving a request for registration information from the endpoint, the registration information referring to information for registering the endpoint; and providing the registration information to the endpoint.

11. The logic of claim 9, operable to receive the notification that the endpoint is authorized to receive the configuration information by:

receiving the notification, the notification sent in response to registration of the endpoint.

12. The logic of claim 9, operable to provide the update by providing:

the current version of the configuration information.

13. A system for providing configuration information to an endpoint, comprising:

means for receiving at a file server a configuration information request from an endpoint, the configuration information request requesting configuration information for the endpoint;

means for establishing whether the endpoint is authorized to receive the configuration information;

means for performing the following if the endpoint is not authorized to receive the configuration information:

instructing the endpoint to register to receive the configuration information; and receiving a notification that the endpoint is authorized to receive the configuration information; and means for providing the configuration information to the endpoint when the endpoint is authorized to receive the configuration information;

means for receiving at the file server a second configuration information request from the endpoint, the second configuration information request having a version identifier;

means for establishing whether the version identifier indicates that the configuration information is a current version used at the file server; and if the version identifier indicates that the configuration information is not the current version, means for providing, by the file server, an update to the endpoint that comprises one or more differences between the version of the configuration information identified by the version identifier and the current version of the configuration information.

14. A method for providing configuration information to an endpoint, comprising:

receiving at a file server a configuration information request from an endpoint, the configuration information request requesting configuration information for the endpoint;

establishing whether the endpoint is authorized to receive the configuration information;

if the endpoint is not authorized to receive the configuration information:

instructing the endpoint to register to receive the configuration information by:

sending the endpoint a message indicating that the endpoint is not authorized to receive the configuration information;

receiving a request for registration information from the endpoint, the registration information referring to information for registering the endpoint; and providing the registration information to the endpoint; and receiving a notification that the endpoint is authorized to receive the configuration information, the notification sent in response to registration of the endpoint;

providing the configuration information to the endpoint when the endpoint is authorized to receive the configuration information;

receiving at the file server a second configuration information request from the endpoint, the second configuration information request having a version identifier;

establishing whether the version identifier indicates that the configuration information is a current version used at the file server; and if the version identifier indicates that the configuration information is not the current version, providing, by the file server, an update to the endpoint that comprises:

the current version of the configuration information; and one or more differences between the version of the configuration information identified by the version identifier and the current version of the configuration information.

* * * * *

UNITED STATES PATENT AND TRADEMARK OFFICE
CERTIFICATE OF CORRECTION

| | | |
|---|---|---|
| PATENT NO. | : 7,627,656 B1 | Page 1 of 1 |
| APPLICATION NO. | : 11/129818 | |
| DATED | : December 1, 2009 | |
| INVENTOR(S) | : Anand et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Second Day of November, 2010

David J. Kappos
*Director of the United States Patent and Trademark Office*